US009820179B2

(12) United States Patent
Kanamarlapudi et al.

(10) Patent No.: US 9,820,179 B2
(45) Date of Patent: Nov. 14, 2017

(54) DEVICES AND METHODS FOR FACILITATING UPLINK TRANSMISSIONS ON TWO OR MORE CARRIERS

(71) Applicant: QUALCOMM Incorporated, San Diego, CA (US)

(72) Inventors: Sitaramanjaneyulu Kanamarlapudi, San Diego, CA (US); Liangchi Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 69 days.

(21) Appl. No.: 14/624,413

(22) Filed: Feb. 17, 2015

(65) Prior Publication Data

US 2015/0341823 A1 Nov. 26, 2015

Related U.S. Application Data

(60) Provisional application No. 62/002,123, filed on May 22, 2014.

(51) Int. Cl.
*H04W 28/02* (2009.01)
*H04W 28/08* (2009.01)
*H04L 5/00* (2006.01)

(52) U.S. Cl.
CPC ......... *H04W 28/0252* (2013.01); *H04L 5/001* (2013.01); *H04L 5/0064* (2013.01); *H04L 5/0087* (2013.01); *H04W 28/0278* (2013.01); *H04W 28/085* (2013.01)

(58) Field of Classification Search
CPC .......... H04W 28/0252; H04W 28/0278; H04L 5/001; H04L 5/0064; H04L 5/0087; H02W 28/085
See application file for complete search history.

(56) References Cited

U.S. PATENT DOCUMENTS

| 7,826,370 | B1 | 11/2010 | Vargantwar et al. | |
|---|---|---|---|---|
| 2010/0232382 | A1* | 9/2010 | Gauvreau | H04W 72/02 370/329 |
| 2010/0272078 | A1* | 10/2010 | Pani | H04W 28/06 370/336 |
| 2013/0083713 | A1* | 4/2013 | Johansson | H04W 52/0225 370/311 |
| 2013/0132604 | A1 | 5/2013 | Cohen et al. | |
| 2013/0195071 | A1* | 8/2013 | Ohta | H04W 72/0453 370/330 |

OTHER PUBLICATIONS

International Search Report and Written Opinion—PCT/US2015/028449—ISA/EPO—dated Jul. 14, 2015.

* cited by examiner

*Primary Examiner* — Walter Divito
(74) *Attorney, Agent, or Firm* — Loza & Loza, LLP (57) ABSTRACT

Wireless User Equipment (UEs) are adapted to facilitate uplink transmissions on two or more carriers. According to one example, a wireless user equipment can determine whether a size of data to be transmitted is greater than or less than a predetermined threshold. When the size of the data is less than the predetermined threshold, the wireless user equipment can transmit the data on a primary carrier. When the size of the data is greater than, or equal to the predetermined threshold, the wireless user equipment can transmit an initial portion of the data on the secondary carrier, and any remaining portion of the data can be transmitted on the primary carrier. Other aspects, embodiments, and features are also included.

28 Claims, 8 Drawing Sheets

DEVICES AND METHODS FOR FACILITATING UPLINK TRANSMISSIONS ON TWO OR MORE CARRIERS

PRIORITY CLAIM

The present Application for Patent claims priority to Provisional Application No. 62/002,123 entitled "Devices and Methods For Facilitating Uplink Transmissions On Two Or More Carriers" filed May 22, 2014, and assigned to the assignee hereof and hereby expressly incorporated by reference herein.

TECHNICAL FIELD

The technology discussed below relates generally to wireless communications, and more specifically to methods and devices for facilitating uplink transmissions on two or more carriers.

BACKGROUND

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems.

Multiple types of devices are adapted to utilize such wireless communications systems. These devices may be generally referred to as an access terminal or a user equipment (UE). In general, it can be desirable to increase the throughput and spectral efficiency for uplink transmissions from access terminals to the wireless communications system to enable increased numbers of access terminals within the network and improve user experience.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate uplink transmissions from a wireless user equipment on two or more carriers in a wireless communications system. According to at least one aspect of this disclosure, a wireless user equipment may include a communications interface configured for uplink transmissions on a primary carrier and a secondary carrier, a storage medium, and a processing circuit coupled to the communications interface and the storage medium. The processing circuit may be configured to determine whether a size of data to be transmitted via the communications interface is greater than or less than a predetermined threshold. The processing circuit may further be configured to transmit the data via the communications interface on the primary carrier when the size of the data is less than the predetermined threshold, and to transmit an initial portion of the data via the communications interface on the secondary carrier and any remaining portion of the data on the primary carrier when the size of the data is greater than or equal to the predetermined threshold.

Further aspects provide methods operational on access terminals and/or a wireless user equipment including means to perform such methods. One or more examples of such methods may include determining whether a size of data to be transmitted is greater than or less than a predetermined threshold. When the size of the data is less than the predetermined threshold, the data may be transmitted on a primary carrier. When the size of the data is greater than or equal to the predetermined threshold, a predetermined amount of the data may be transmitted on a secondary carrier and any remaining amount of the data may be transmitted on the primary carrier.

Still further aspects include processor-readable storage mediums comprising programming executable by a processing circuit. According to one or more examples, such programming may be adapted for causing the processing circuit to determine whether a size of data to be transmitted is greater than or less than a predetermined threshold. The programming may further be adapted for causing the processing circuit to transmit the data on a primary carrier when the size of the data is less than the predetermined threshold. Additionally, the programming may be adapted for causing the processing circuit to transmit an initial portion of the data on a secondary carrier and any remaining portion of the data on the primary carrier when the size of the data is greater than or equal to the predetermined threshold.

Other aspects, features, and embodiments associated with the present disclosure will become apparent to those of ordinary skill in the art upon reviewing the following description in conjunction with the accompanying figures.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of telecommunication systems, network architectures, and communication standards. Certain aspects of the disclosure are described below for UMTS and 3rd Generation Partnership Project (3GPP) protocols and systems, and related terminology may be found in much of the following description. However, those of ordinary skill in the art will recognize that one or more aspects of the present disclosure may be employed and included in one or more other wireless communication protocols and systems.

Figure 1:
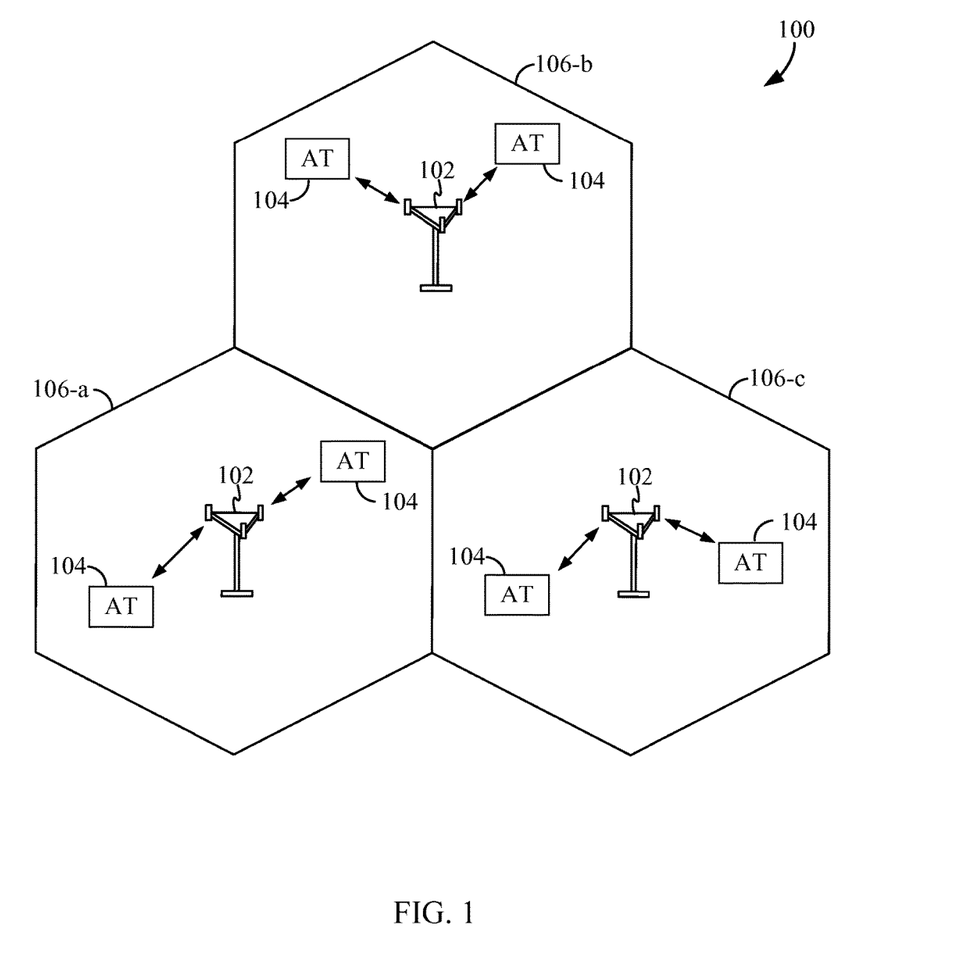
FIG. 1 is a block diagram of a network environment in which one or more aspects of the present disclosure may find application.

Referring now to FIG. 1, a block diagram of a network environment in which one or more aspects of the present disclosure may find application is illustrated. The wireless communications system 100 is adapted to facilitate wireless communication between one or more base stations 102 and access terminals 104. The base stations 102 and access terminals 104 may be adapted to interact with one another through wireless signals. In some instances, such wireless interaction may occur on multiple carriers (waveform signals of different frequencies). Each modulated signal may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. Such a base station 102 may also be referred to by those skilled in the art as a base transceiver station (BTS), a radio base station, a radio transceiver, a transceiver function, a basic service set (BSS), and extended service set (ESS), a node B, a femto cell, a pico cell, or some other suitable terminology.

Figure 2:
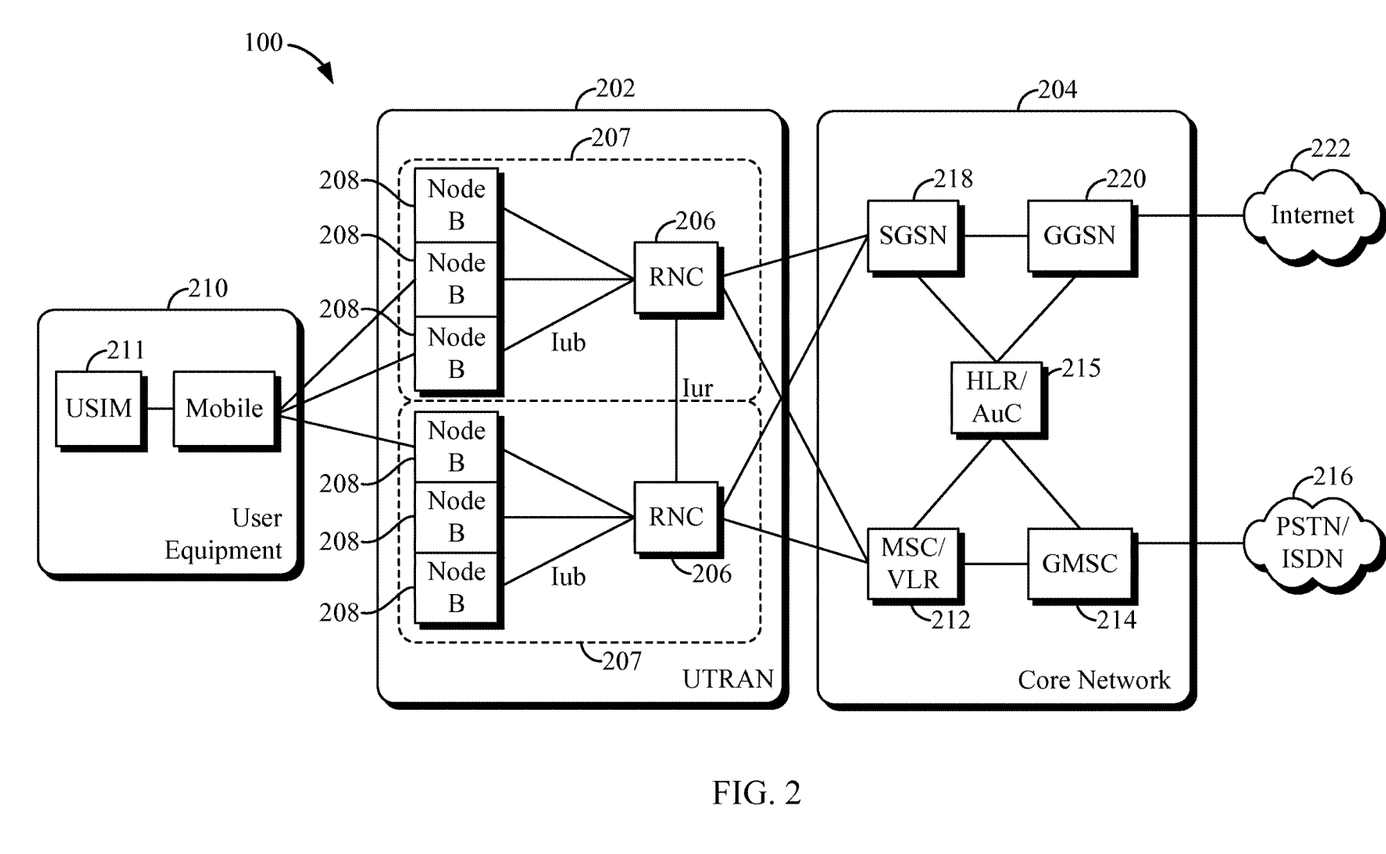
FIG. 2 is a block diagram illustrating select components of the wireless communication system of FIG. 1 according to at least one example.

The base stations 102 are configured to communicate with the access terminals 104 under the control of a radio network controller (see FIG. 2). Each of the base station 102 sites can provide communication coverage for a respective coverage area 106. The coverage area 106 for each base station 102 here is identified as cells 106-a, 106-b, or 106-c. Such cells 106-a, 106-b, or 106-c may be defined geographically and/or may be defined in accordance with a frequency, scrambling code, etc. The coverage area 106 for a base station 102 may be divided into sectors (not shown, but making up only a portion of the coverage area). In various examples, the system 100 may include base stations 102 of different types.

One or more access terminals 104 may be dispersed throughout the coverage areas 106. Each access terminal 104 may communicate with one or more base stations 102. An access terminal 104 may generally include one or more devices that communicate with one or more other devices through wireless signals. Such an access terminal 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. An access terminal 104 may include a mobile terminal and/or an at least substantially fixed terminal Examples of an access terminal 104 include a mobile phone, a pager, a wireless modem, a personal digital assistant, a personal information manager (PIM), a personal media player, a palmtop computer, a laptop computer, a tablet computer, a television, an appliance, an e-reader, a digital video recorder (DVR), a machine-to-machine (M2M) device, meter, entertainment device, sensor, sensing device, wearable device, router, and/or other communication/computing device which communicates, at least partially, through a wireless or cellular network.

Turning to FIG. 2, a block diagram illustrating select components of the wireless communication system 100 is depicted according to at least one example. By way of example and without limitation, the wireless communication system 100 may be implemented as a Universal Mobile Telecommunications System (UMTS) system employing a wideband code division multiple access (W-CDMA) air interface. A UMTS network includes three interacting domains: a Core Network (CN) 204, a UMTS Terrestrial Radio Access Network (UTRAN) 202, and an access terminal commonly referred to as a User Equipment (UE) 210.

In this example, the UTRAN 202 may provide various wireless services including telephony, video, data, messaging, broadcasts, and/or other services. The UTRAN 202 may include a plurality of Radio Network Subsystems (RNSs) such as the illustrated RNSs 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

The geographic region covered by the RNS 207 may be divided into a number of cells, with a base station serving each cell. A base station is commonly referred to as a Node B in UMTS applications. For clarity, three Node Bs 208 are shown in each RNS 207. However, the RNSs 207 may include any number of wireless Node Bs. The Node Bs 208 provide wireless access points to a core network (CN) 204 for any number of UEs 210. The UE 210 may include a universal subscriber identity module (USIM) 211, which contains a user's subscription information to a network. The downlink (DL), also called the forward link, refers to the communication link from a Node B 208 to a UE 210, and the uplink (UL), also called the reverse link, refers to the communication link from a UE 210 to a Node B 208.

The core network 204 interfaces with one or more access networks, such as the UTRAN 202, to provide various services to UEs 210 that are connected via the radio access network UTRAN 202. The core network 204 may include a circuit-switched (CS) domain and a packet-switched (PS) domain. Some examples of the circuit-switched entities include a Mobile services Switching Centre (MSC), a Visitor Location Register (VLR), and a Gateway MSC (GMSC). Some examples of Packet-switched entities include a Serving GPRS Support Node (SGSN) and a Gateway GPRS Support Node (GGSN). Some network entities, like EIR, HLR, VLR and AuC may be shared by both of the circuit-switched and packet-switched domains.

A UMTS air interface may be a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such DS-CDMA technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface.

A high speed packet access (HSPA) air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

Figure 3:
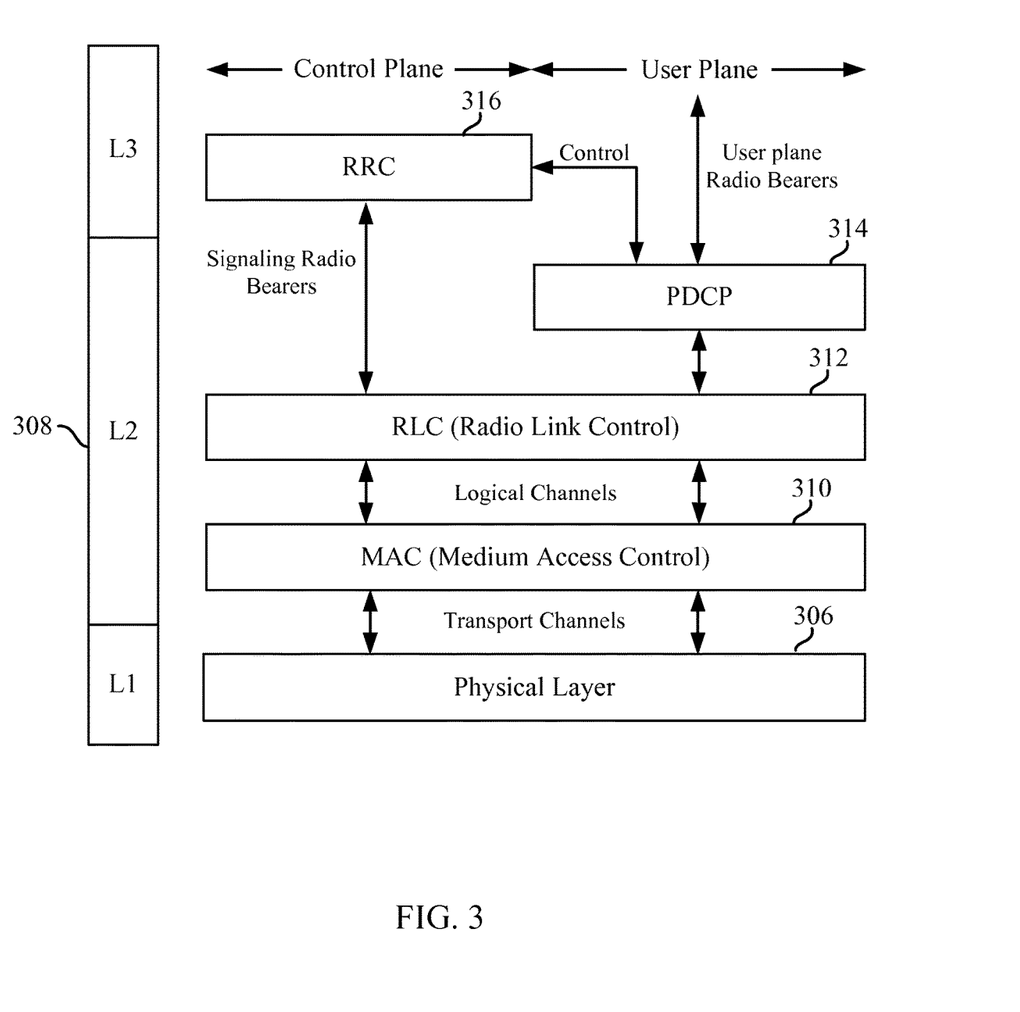
FIG. 3 is a block diagram illustrating an example of a protocol stack architecture which may be implemented by an access terminal.

In a wireless telecommunication system, the radio protocol architecture between a mobile device and a cellular network may take on various forms depending on the particular application. An example for a 3GPP high-speed packet access (HSPA) system will now be presented with reference to FIG. 3, illustrating an example of the radio protocol architecture for the user and control planes between the UE 210 and the Node B 208. Here, the user plane or data plane carries user traffic, while the control plane carries control information, i.e., signaling.

Turning to FIG. 3, the radio protocol architecture for the UE 210 and Node B 208 is shown with three layers: Layer 1, Layer 2, and Layer 3. Although not shown, the UE 210 may have several upper layers above the L3 layer including a network layer (e.g., IP layer) that is terminated at a PDN gateway on the network side, and an application layer that is terminated at the other end of the connection (e.g., far end UE, server, etc.).

At Layer 3, the RRC layer 316 handles control plane signaling between the UE 210 and the Node B 208. RRC layer 316 includes a number of functional entities for routing higher layer messages, handling broadcast and paging functions, establishing and configuring radio bearers, etc.

The data link layer, called Layer 2 (L2 layer) 308 is between Layer 3 and the physical layer 306, and is responsible for the link between the UE 210 and Node B 208. In the illustrated air interface, the L2 layer 308 is split into sublayers. In the control plane, the L2 layer 308 includes two sublayers: a medium access control (MAC) sublayer 310 and a radio link control (RLC) sublayer 312. In the user plane, the L2 layer 308 additionally includes a packet data convergence protocol (PDCP) sublayer 314. Of course, those of ordinary skill in the art will comprehend that additional or different sublayers may be utilized in a particular implementation of the L2 layer 308, still within the scope of the present disclosure.

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between Node Bs.

The RLC sublayer 312 provides segmentation and reassembly of upper layer data packets, retransmission of lost data packets, and reordering of data packets to compensate for out-of-order reception due to a hybrid automatic repeat request (HARQ).

The MAC sublayer 310 provides multiplexing between logical channels and transport channels. The MAC sublayer 310 is also responsible for allocating the various radio resources (e.g., resource blocks) in one cell among the UEs. The MAC sublayer 310 is also responsible for HARQ operations.

Layer 1 is the lowest layer and implements various physical layer signal processing functions. Layer 1 will be referred to herein as the physical layer (PHY) 306. At the PHY layer 306, the transport channels are mapped to different physical channels.

Data generated at higher layers, all the way down to the MAC layer 310, are carried over the air through transport channels. 3GPP Release 5 specifications introduced downlink enhancements referred to as HSDPA. HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries HARQ ACK/NACK signaling on the uplink to indicate whether a corresponding packet transmission was decoded successfully. That is, with respect to the downlink, the UE 210 provides feedback to the Node B 208 over the HS-DPCCH to indicate whether it correctly decoded a packet on the downlink.

HS-DPCCH further includes feedback signaling from the UE 210 to assist the Node B 208 in taking the right decision in terms of modulation and coding scheme and precoding weight selection, this feedback signaling including the channel quality indicator (CQI) and precoding control information (PCI).

3GPP Release 6 specifications introduced uplink enhancements referred to as Enhanced Uplink (EUL) or High Speed Uplink Packet Access (HSUPA). HSUPA utilizes as its transport channel the EUL Dedicated Channel (E-DCH). The E-DCH is transmitted in the uplink together with the Release 99 DCH. The control portion of the DCH, that is, the DPCCH, carries pilot bits and downlink power control commands on uplink transmissions. In the present disclosure, the DPCCH may be referred to as a control channel (e.g., a primary control channel) or a pilot channel (e.g., a primary pilot channel) in accordance with whether reference is being made to the channel's control aspects or its pilot aspects.

The E-DCH is implemented by physical channels including the E-DCH Dedicated Physical Data Channel (E-DPDCH) and the E-DCH Dedicated Physical Control Channel (E-DPCCH). In addition, HSUPA relies on additional physical channels including the E-DCH HARQ Indicator Channel (E-HICH), the E-DCH Absolute Grant Channel (E-AGCH), and the E-DCH Relative Grant Channel (E-RGCH).

Further, in some instances a UE may be configured to employ a Dual-Channel High Speed Uplink Packet Access (DC-HSUPA). For DC-HSUPA, the physical channels may also include one or more of a Secondary E-DPDCH (S-E-

DPDCH), a Secondary E-DPCCH (S-E-DPCCH), a Secondary DPCCH (S-DPCCH), and/or an EUL Rank and Offset Channel (E-ROCH).

Figure 4:
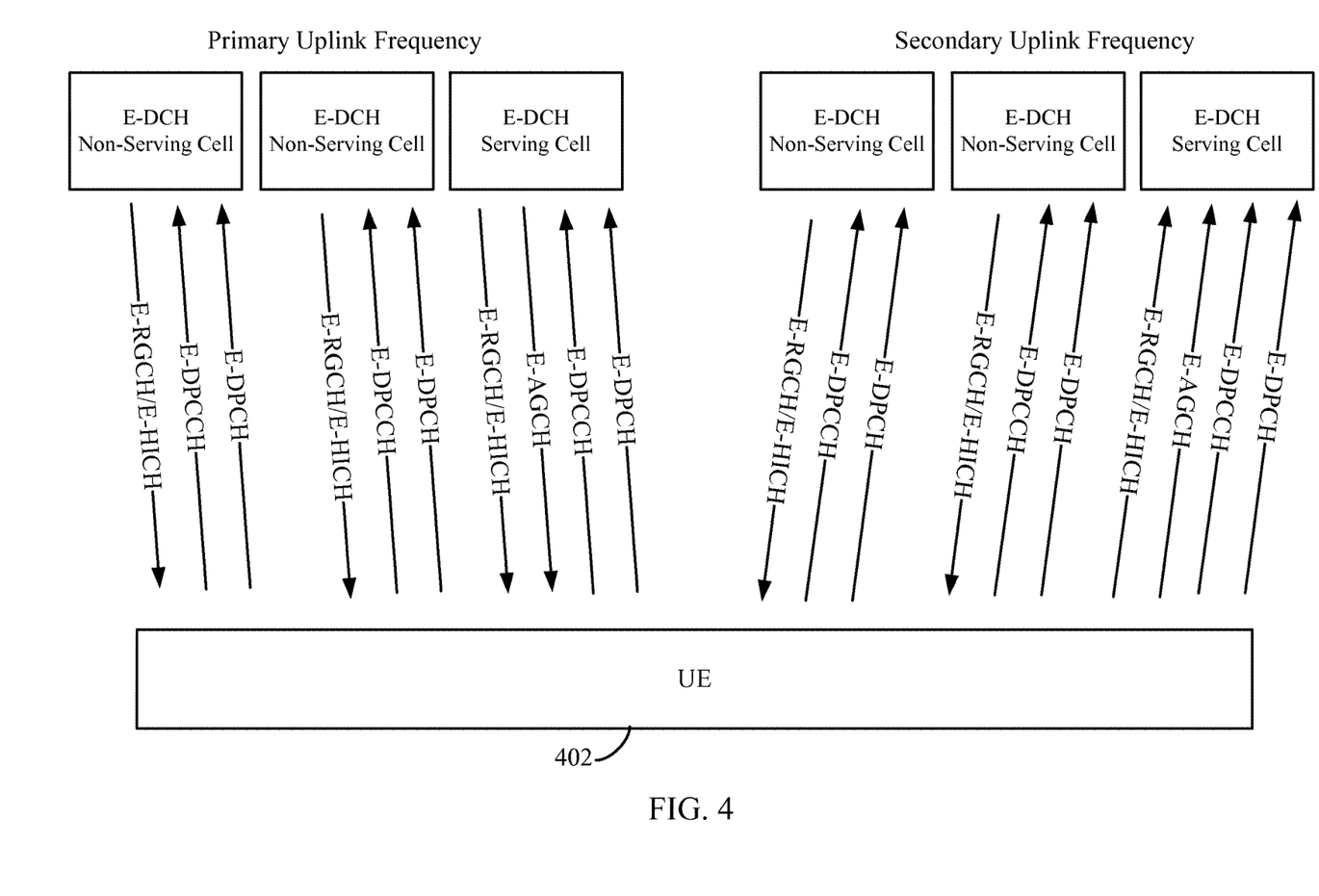
FIG. 4 illustrates an example of a user equipment employing DC-HSUPA according to at least one implementation.

FIG. 4 illustrates an example of a UE 402 employing DC-HSUPA according to at least one implementation. As shown, a UE 402 may operate with a primary active set on a primary uplink frequency (or primary uplink carrier) and a secondary active set on a secondary uplink frequency (or secondary uplink carrier). FIG. 4 also illustrates the various physical channels for the primary E-DCH and the secondary E-DCH. Typically, all scheduled data is prioritized by the UE for transmission on the secondary carrier, any remaining scheduled data should be transmitted on the primary carrier, and any non-scheduled data is only transmitted on the primary carrier.

In some instances, the downlink control channels corresponding to the secondary uplink carrier may be transmitted on the primary downlink carrier. As a result, the F-DPCH, E-AGCH, E-RGCH, and E-HICH channels are transmitted on the primary carrier, but affect the secondary uplink. Such a configuration can enable the UE to enter a discontinuous transmission (DTX) mode on the secondary uplink F-DPCH to reduce power consumption, can enable gain power saving due to less downlink control activities on the secondary carrier, and/or can reduce the need for out-of-sync procedures on the secondary carrier, as well as other benefits. However, several optimizations achieved by such a configuration may be defeated as a result of the secondary carrier being used for scheduled data transmissions before the primary carrier.

For example, a DC-HSUPA User Equipment typically maps data resource blocks onto a scheduled flow and signaling resource blocks onto a non-scheduled flow. Under typical uplink-selection parameters, scheduled data flow (mostly user traffic data) is first sent over the secondary uplink carrier, and then scheduled data flow is sent over the primary uplink carrier. Non-scheduled data flow (mostly signaling messages) is sent over the primary uplink carrier. Thus, the UE sends user traffic data as much as possible (and as soon as possible) on the secondary carrier. Considering the popularity of smartphone applications, such as social media applications, video/photo uploading, info sharing, etc., intensive uplink traffic can be foreseen, that may defeat the sought-after benefits of transmitting the downlink control channels for the secondary uplink carrier on the primary downlink carrier.

According to an aspect of the present disclosure, UEs can be configured to employ the primary carrier to uplink transmissions smaller than a predefined threshold. According to additional aspects, when an uplink transmission is greater than the predefined threshold, the UE can transmit a data transmission on the primary carrier for the first transmission time interval (TTI) including an indicator adapted to inform the network that the UE will be transmitting scheduled data over the secondary uplink carrier, with the primary uplink carrier used to send remaining data, if any.

Figure 5:
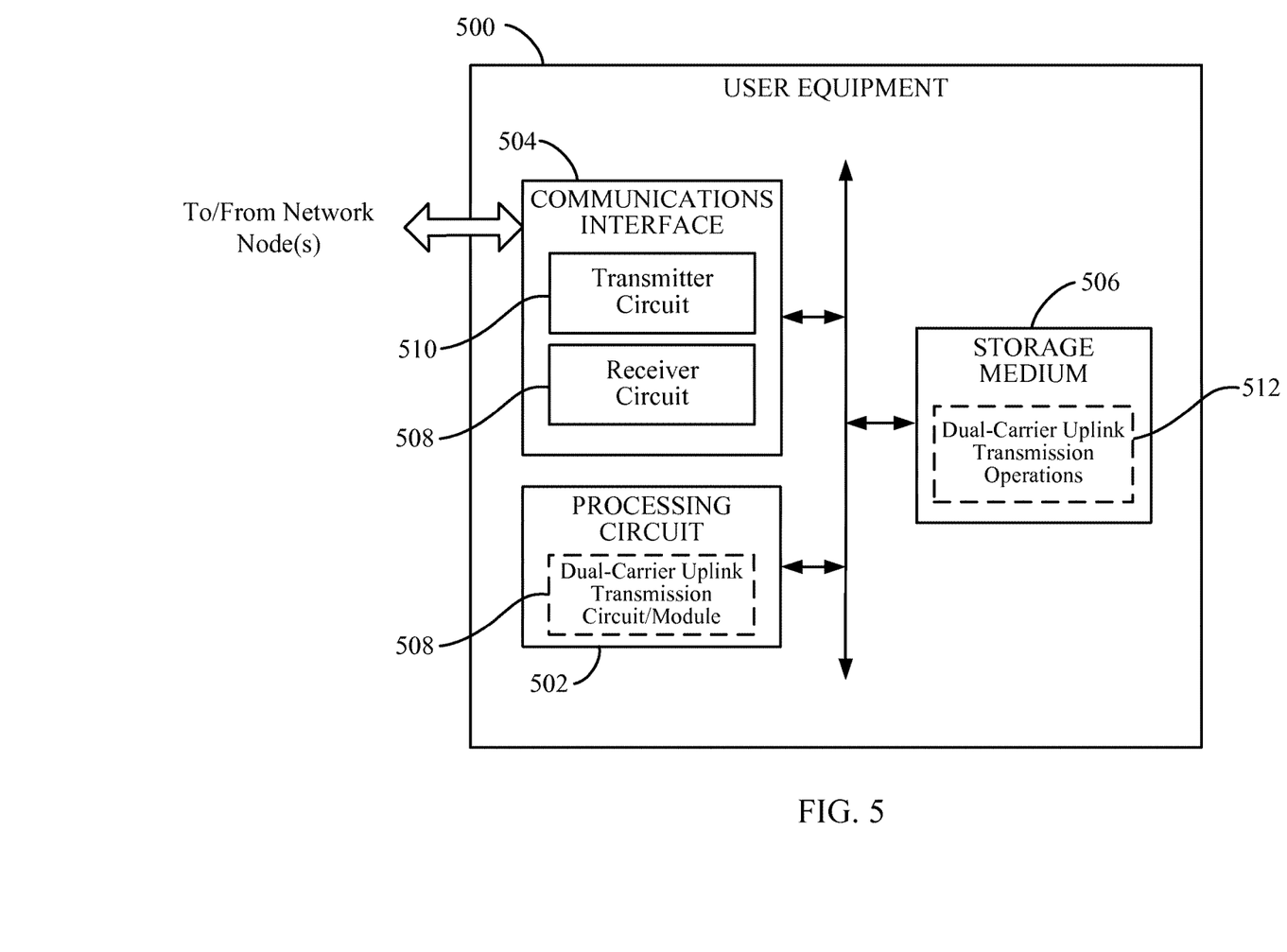
FIG. 5 is a block diagram illustrating select components of a wireless user equipment according to at least one example.

Turning to FIG. 5, a block diagram is shown illustrating select components of a User Equipment (UE) 500 according to at least one example of the present disclosure. The UE 500 includes a processing circuit 502 coupled to or placed in electrical communication with a communications interface 504 and a storage medium 506.

The processing circuit 502 includes circuitry arranged to obtain, process and/or send data, control data access and storage, issue commands, and control other desired operations. The processing circuit 502 may include circuitry configured to implement desired programming provided by appropriate media, and/or circuitry configured to perform one or more functions described in this disclosure. For example, the processing circuit 502 may be implemented as one or more processors, one or more controllers, and/or other structure configured to execute executable programming Examples of the processing circuit 502 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 502 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 502 are for illustration and other suitable configurations within the scope of the present disclosure are also contemplated.

The processing circuit 502 can include circuitry configured for processing data, including the execution of programming, which may be stored on the storage medium 506. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 502 may include a dual-carrier uplink transmission circuit and/or module 508. The dual-carrier uplink transmission circuit/module 508 may include circuitry and/or programming (e.g., programming stored on the storage medium 506) configured to determine whether to use a primary carrier or a secondary carrier for uplink data transmissions sent by the UE 500.

The communications interface 504 is configured to facilitate wireless communications of the UE 500. For example, the communications interface 504 may include circuitry and/or programming configured to facilitate the communication of information bi-directionally with respect to one or more wireless network devices (e.g., network nodes). The communications interface 504 may be coupled to one or more antennas (not shown), and includes wireless transceiver circuitry, including at least one receiver circuit 508 (e.g., one or more receiver chains) and/or at least one transmitter circuit 510 (e.g., one or more transmitter chains).

The storage medium 506 may represent one or more processor-readable devices for storing programming, such as processor executable code or instructions (e.g., software, firmware), electronic data, databases, or other digital information. The storage medium 506 may also be used for storing data that is manipulated by the processing circuit 502 when executing programming. The storage medium 506 may be any available media that can be accessed by a general purpose or special purpose processor, including portable or fixed storage devices, optical storage devices, and various other mediums capable of storing, containing and/or carrying programming By way of example and not limitation, the storage medium 506 may include a processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 506 may be coupled to the processing circuit 502 such that the processing circuit 502 can read information from, and write information to, the storage medium 506. That is, the storage medium 506 can be coupled to the processing circuit 502 so that the storage medium 506 is at least accessible by the processing circuit 502, including examples where the storage medium 506 is integral to the processing circuit 502 and/or examples where the storage medium 506 is separate from the processing circuit 502 (e.g., resident in the UE 500, external to the UE 500, distributed across multiple entities).

The storage medium 506 may include programming stored thereon. Such programming, when executed by the processing circuit 502, can cause the processing circuit 502 to perform one or more of the various functions and/or process steps described herein. In at least some examples, the storage medium 506 may include dual-carrier uplink transmission operations 512. The dual-carrier uplink transmission operations 512 are configured to cause the processing circuit 502 to determine whether to use a primary carrier or a secondary carrier for uplink transmissions, as described herein.

According to one or more aspects of the present disclosure, the processing circuit 502 is configured to perform (independently or in conjunction with the dual-carrier uplink transmission operations 512 on the storage medium 506) any or all of the processes, functions, steps and/or routines for any or all of the UEs described herein (e.g., access terminal 104, UE 210, UE 402, UE 500). As used herein, the term "configured" in relation to the processing circuit 502 may refer to the processing circuit 502 being one or more of adapted, constructed, employed, implemented, and/or programmed (in conjunction with the dual-carrier uplink transmission operations 512) to perform a particular process, function, step and/or routine according to various features described herein.

Figure 6:
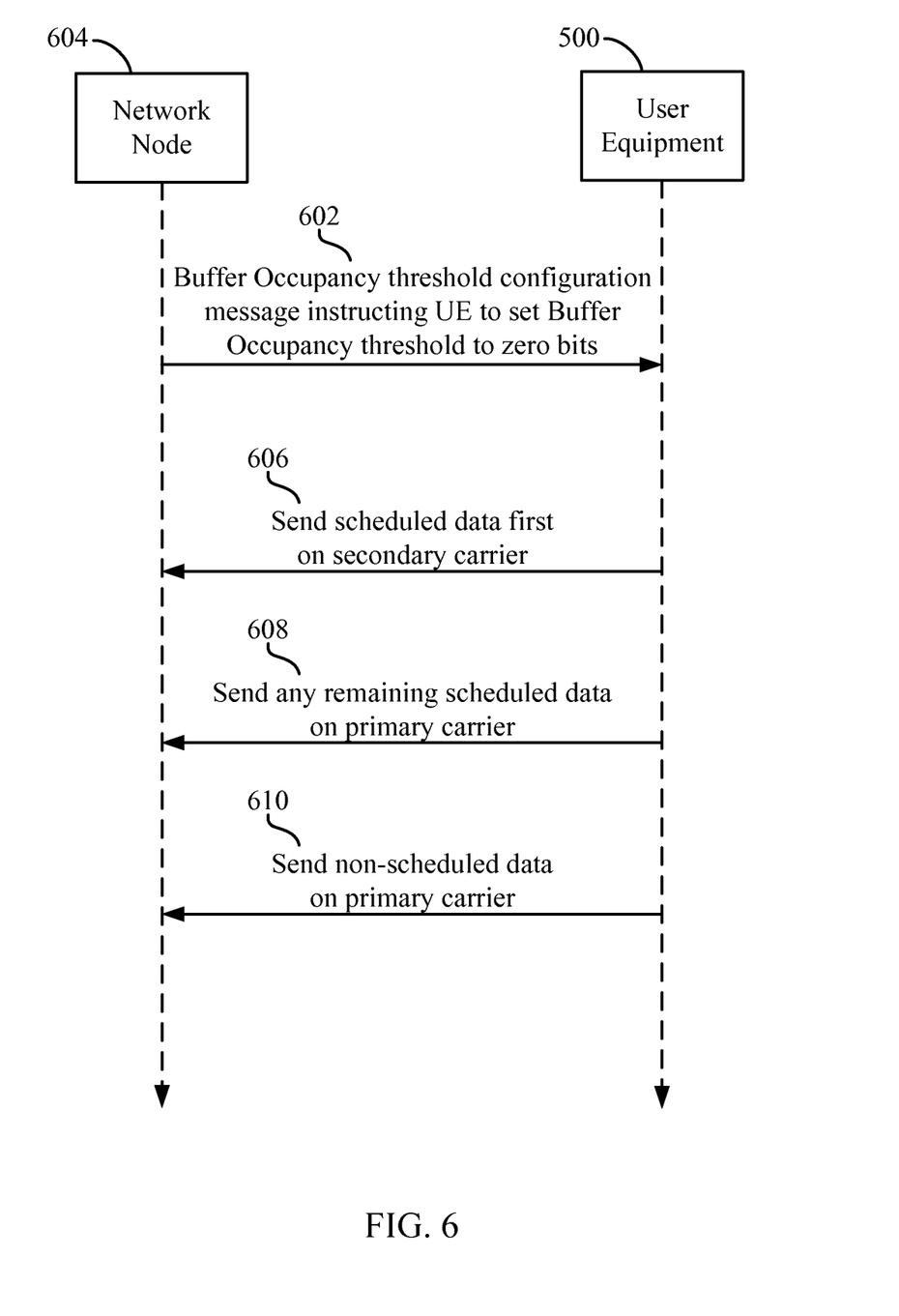
FIG. 6 shows a flow diagram illustrating an example of a first mode of operation according to one implementation.

In operation, the UE 500 may be configured to employ two modes for determining which uplink carrier to employ to transmit user traffic data. FIG. 6 shows a flow diagram illustrating an example of a first mode of operation according to one implementation. As shown, the UE 500 may receive a transmission 602 from a network entity 604. The received transmission 602 may include an uplink transmission mode indicator instructing the UE 500 to employ legacy Release 9 DC-HSUPA operations. In some examples, the indicator may be in the form of an instruction to set a data size or buffer occupancy threshold to zero (0). For instance, the indicator may be a configuration parameter for the buffer occupancy threshold, where the parameter is equal to zero (0) bytes. In other words, the received transmission 602 may be a buffer occupancy threshold configuration message indicating a buffer occupancy threshold of zero (0) to be employed by the UE 500.

In response to the received configuration message, the UE 500 can be configured to send a predefined amount of scheduled data first on the secondary carrier at 606, and send any remaining scheduled data on the primary carrier at 608. Further, the UE can also be configured to send any non-scheduled data on the primary carrier.

Figure 7:
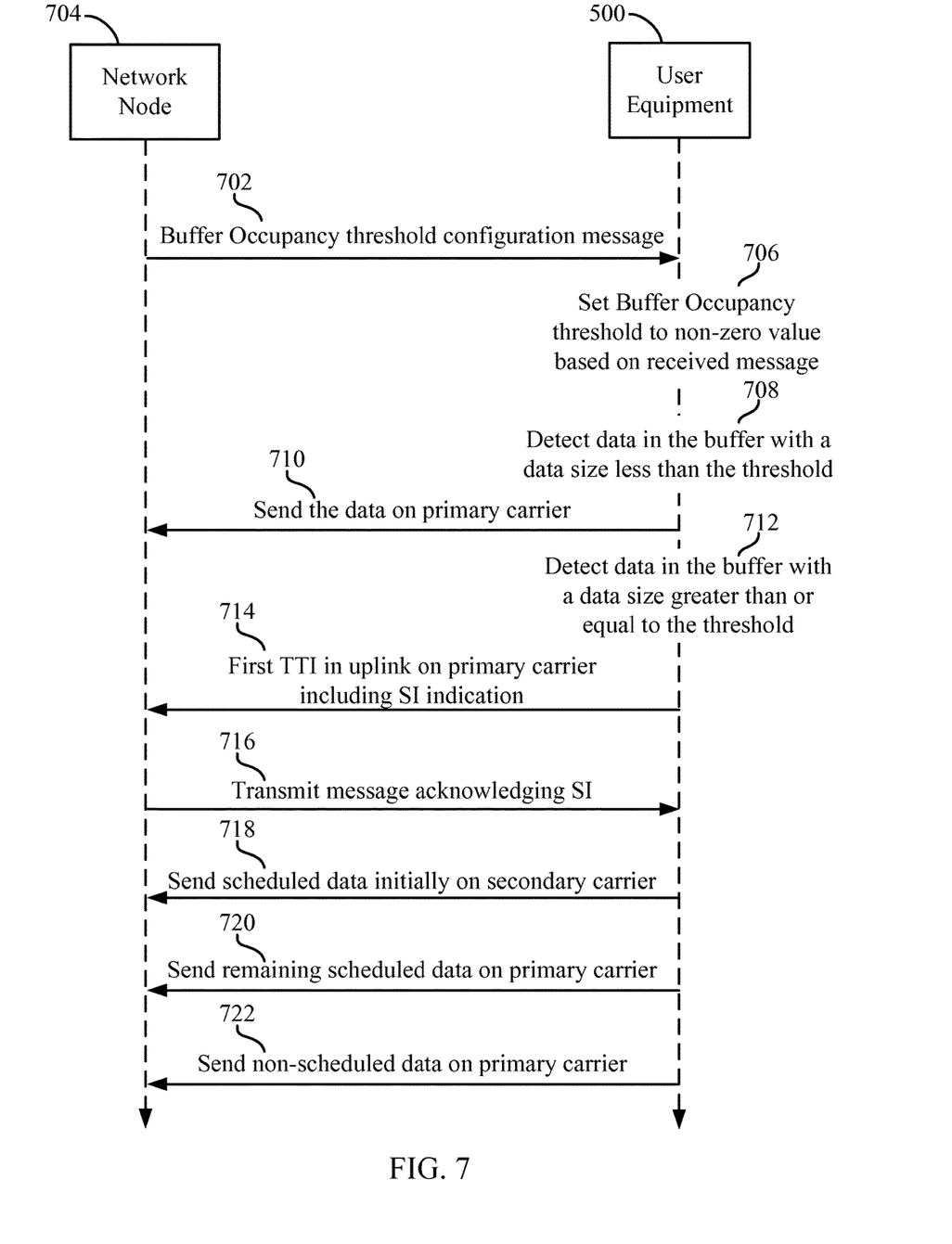
FIG. 7 shows a flow diagram illustrating an example of a second mode of operation according to one implementation.

FIG. 7 shows a flow diagram illustrating an example of a second mode of operation according to one implementation. As shown, the UE 500 may receive a transmission 702 from a network entity 704. The received transmission 702 may include an uplink transmission mode indicator instructing the UE 500 to employ an enhanced mode of DC-HSUPA operation. In some examples, the indicator may include an instruction to set the data size or buffer occupancy threshold to a non-zero value. In other words, the received transmission 702 may be a buffer occupancy threshold configuration message indicating a buffer occupancy threshold to be employed by the UE 500.

In response to the received message 702, the UE 500 can set the threshold (e.g., the buffer occupancy threshold) to the indicated non-zero value at 706. At 708, the UE 500 can detect data in a buffer to be transmitted, where the data size is less than the threshold. In response to the data in the buffer being smaller than the threshold, the data is sent 710 by the UE 500 on the primary carrier.

The UE 500 may at some point in time also, or alternatively, detect data 712 in the buffer to be transmitted, where the data size is greater than or equal to the threshold. In response to the data in the buffer being greater than or equal to the threshold, the UE 500 sends a first transmission time interval (TTI) 714 on the primary carrier with a scheduling information (SI) indicator adapted to inform the network entity 704 that the UE 500 is employing a legacy DC-HSUPA model for transmitting the current uplink data.

The network node 704 may, in response to the scheduling information (SI) indicator, send a message 716 acknowledging the SI indicator. On receipt of the SI acknowledgment, the UE 500 may send scheduled data initially on the secondary carrier at 718, and any remaining scheduled data on the primary carrier 720. Further, the UE 500 can send non-scheduled data on the primary carrier 722.

Figure 8:
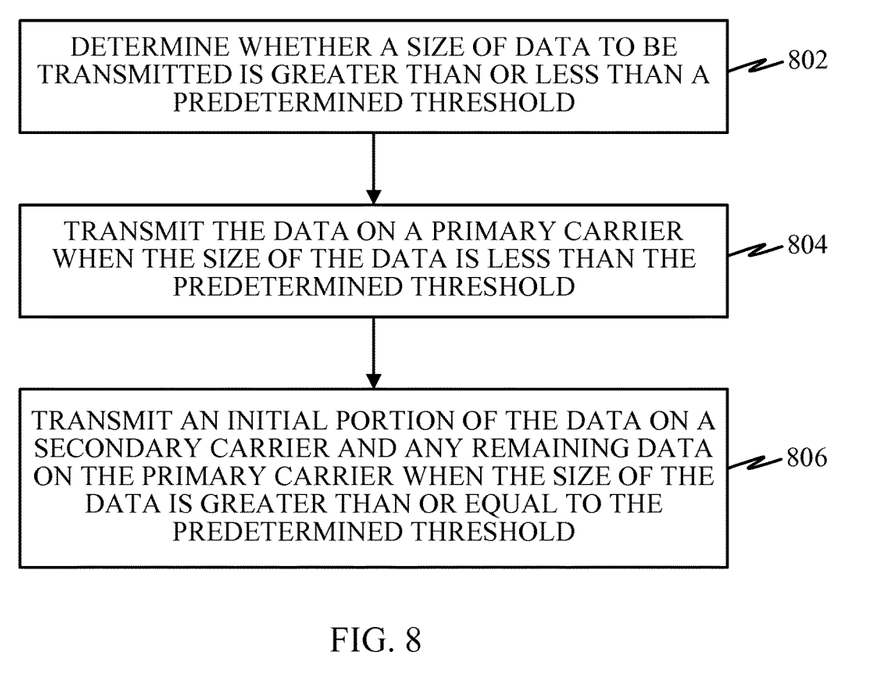
FIG. 8 is a flow diagram illustrating a method operational on a wireless user equipment according to at least one example.

FIG. 8 is a flow diagram illustrating at least one example of a method operational on a UE, such as the UE 500. Referring to FIGS. 5 and 8, a UE 500 can determine whether a size of data to be transmitted is greater than or less than a predetermined threshold at step 802. For example, the processing circuit 502 (e.g., the dual-carrier uplink transmission circuit/module 508) may be configured to determine whether a size of uplink data is above or below a predetermined threshold. In at least some examples, the predetermined threshold may be a buffer occupancy threshold. In such examples, the processing circuit 502 (e.g., the dual-carrier uplink transmission circuit/module 508) can be configured to determine whether a size of uplink data in a buffer (e.g., a buffer implemented by one or more components of the storage medium 506) is above or below the predetermined threshold.

According to one or more implementations, the value for the predetermined threshold can be received from the network. As noted above with reference to FIG. 6, the predetermined threshold can be set to a value of zero (0) in some examples. As noted above with reference to FIG. 7, the predetermined threshold can be set to a value greater than zero (0) in some examples.

Referring still to FIG. 8, the UE 500 may transmit the data on a primary carrier when the size of the data is less than the predetermined threshold at 804. For example, the processing circuit 502 (e.g., the dual-carrier uplink transmission circuit/module 508) may be configured to transmit the data via the communications interface 504 on the primary carrier when the size of the data is less than the predetermined threshold. If the threshold is set to a value of zero (0), then the size of the data cannot be less than the predetermined threshold.

At 806, the UE 500 may transmit a predetermined amount of the data initially on the secondary carrier, and any remaining portion of the data on the primary carrier when the size of the data is greater than or equal to the predetermined threshold. For example, the processing circuit 502 (e.g., the dual-carrier uplink transmission circuit/module 508) may be configured to transmit a predetermined amount of the data via the communications interface 504 on the secondary carrier when the size of the data in the buffer is greater than or equal to the predetermined threshold. In addition, any remaining amount of the data may be transmitted via the communications interface 504 on the primary carrier. In some implementations, the processing circuit 502 (e.g., the dual-carrier uplink transmission circuit/module 508) may be configured to transmit non-scheduled data via the communications interface 504 on the primary carrier when the size of the data is greater than or equal to the predetermined threshold.

Figure 9:
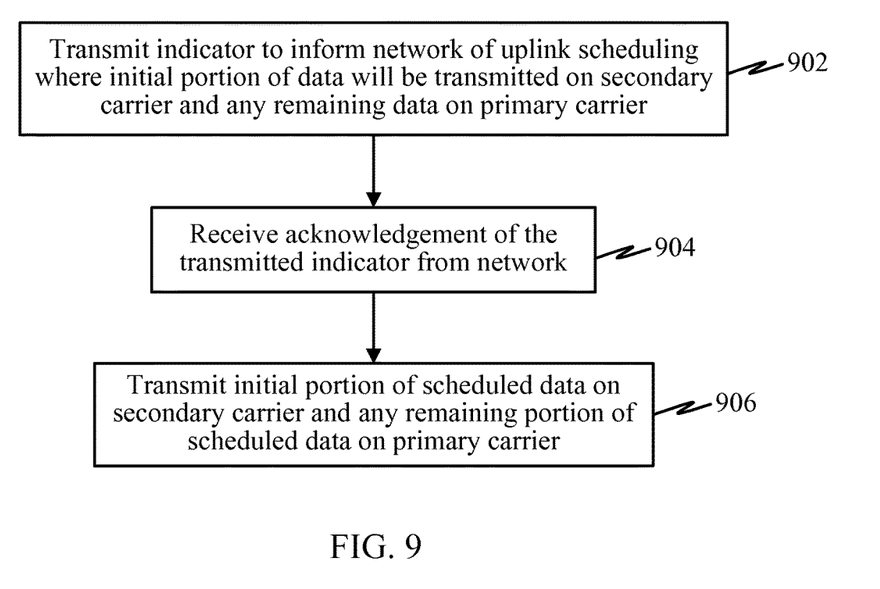
FIG. 9 is a flow diagram illustrating a process for implementing a step in FIG. 8 when a predetermined threshold is set to a value greater than zero (0).

In examples where the predetermined threshold is set to a value greater than zero (0), the UE 500 may communicate with the network before transmitting the initial portion of the data on the secondary carrier and any remaining amount of the data on the primary carrier. For example, FIG. 9 is a flow diagram of at least one example of a process for implementing step 806 in FIG. 8 when the predetermined threshold is set to a value greater than zero (0). Initially, at step 902, the processing circuit 502 (e.g., the dual-carrier uplink transmission circuit/module 508) may be configured to transmit an indicator to inform the network of the uplink scheduling where the predetermined amount of data will be transmitted on the secondary carrier and any remaining data will be transmitted on the primary carrier. The indicator may be transmitted to the network on the first transmission time interval (TTI) on the primary carrier. In some examples, the indicator may be a scheduling information (SI) message.

At step 904, the processing circuit 502 (e.g., the dual-carrier uplink transmission circuit/module 508) may be configured to receive an acknowledgement of the transmitted indicator from the network. In response to the received acknowledgment, the processing circuit 502 (e.g., the dual-carrier uplink transmission circuit/module 508) may be configured to transmit the initial portion of scheduled data on the secondary carrier and any remaining portion of the scheduled data on the primary carrier, at step 906.

While the above discussed aspects, arrangements, and embodiments are discussed with specific details and particularity, one or more of the components, steps, features and/or functions illustrated in FIGS. 1, 2, 3, 4, 5, 6, 7, 8, and/or 9 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 2, 4, and/or 5 may be configured to perform or employ one or more of the methods, features, parameters, and/or steps described in FIGS. 3, 6, 7, 8, and/or 9. The novel algorithms described herein may also be efficiently implemented in software and/or embedded in hardware.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A wireless user equipment, comprising:
   a communications interface configured for uplink transmissions on a primary carrier and a secondary carrier;
   a storage medium; and
   a processing circuit coupled to the communications interface and the storage medium, the processing circuit configured to:
   receive via the communications interface an indicator including an instruction to operate in one of a first mode or a second mode for transmitting data via the communications interface;
   operate in the first mode when the indicator instructs to operate in the first mode, wherein operation in the first mode comprises selection of the secondary carrier to transmit an initial portion of the data via the communications interface and selection of the primary carrier to transmit any remaining portion of the data via the communications interface; and operate in the second mode when the indicator instructs to operate in the second mode, wherein operation in the second mode comprises selection of the primary carrier to transmit the data via the communications interface when a size of the data is less than a predetermined threshold, and selection of the secondary carrier to transmit an initial portion of the data via the communications interface and the primary carrier to transmit any remaining portion of the data via the communications interface when the size of the data is greater than or equal to the predetermined threshold.

2. The wireless user equipment of claim 1, wherein the processing circuit configured to operate in the second mode further comprises the processing circuit configured to:
transmit via the communications interface an indication that the wireless user equipment will transmit the initial portion of the data on the secondary carrier and any remaining portion of the data on the primary carrier when the size of the data is greater than or equal to the predetermined threshold, wherein the indication is transmitted on a first transmission time interval on the primary carrier before transmission of the data; and
receive via the communications interface an acknowledgment of the transmitted indication.

3. The wireless user equipment of claim 1, wherein the processing circuit configured to operate in the second mode further comprises the processing circuit configured to:
transmit non-scheduled data via the communications interface on the primary carrier when the size of the data is greater than or equal to the predetermined threshold.

4. The wireless user equipment of claim 1, wherein the processing circuit is further configured to:
receive a message via the communications interface indicating a value for the predetermined threshold.

5. The wireless user equipment of claim 1, wherein the predetermined threshold is a buffer occupancy threshold associated with a size of the data in a buffer.

6. The wireless user equipment of claim 1, wherein the indicator including an instruction to operate in the first mode comprises an indicator including an instruction to set the predetermined threshold to a value of zero.

7. The wireless user equipment of claim 1, wherein the indicator including an instruction to operate in the first mode comprises an indicator including an instruction to set the predetermined threshold to a value greater than zero.

8. A method operational on a wireless user equipment, comprising:
receiving an indicator including an instruction to operate in one of a first mode or a second mode for transmitting data;
operating in the first mode when the indicator instructs to operate in the first mode, wherein operation in the first mode comprises selection of the secondary carrier to transmit a predetermined amount of the data and the primary carrier for to transmit any remaining amount of the data; and
operating in the second mode when the indicator instructs to operate in the second mode, wherein operation in the second mode comprises selection of the primary carrier for transmitting the data when a size of the data is less than a predetermined threshold, and selection of the secondary carrier to transmit a predetermined amount of the data and the primary carrier for transmitting any remaining amount of the data when the size of the data is greater than or equal to the predetermined threshold.

9. The method of claim 8, wherein operating in the second mode further comprises:
transmitting an indicator to inform a network of the uplink scheduling where the predetermined amount of data will be transmitted on the secondary carrier and any remaining data on the primary carrier, wherein the indicator is transmitted before the data is transmitted; and
receiving an acknowledgement of the transmitted indicator from the network.

10. The method of claim 8, wherein operating in the second mode further comprises:
determining whether a size of data in a buffer is greater than or less than the predetermined threshold.

11. The method of claim 8, further comprising:
transmitting the data on the primary carrier when the size of the data is greater than or equal to the predetermined threshold and when the data is non-scheduled data.

12. The method of claim 8, wherein operating in the second mode further comprises:
receiving a message indicating a value for the predetermined threshold.

13. The method of claim 8, wherein receiving the indicator including an instruction to operate in the first mode comprises:
receiving the indicator including an instruction to set the predetermined threshold to a value of zero.

14. The method of claim 8, wherein receiving the indicator including an instruction to operate in the second mode comprises:
receiving the indicator including an instruction to set the predetermined threshold to a value greater than zero.

15. A wireless user equipment, comprising:
means for receiving an indicator including an instruction to operate in one of a first mode or a second mode for transmitting data;
means for operating in the first mode when the indicator instructs to operate in the first mode, wherein operation in the first mode comprises selection of the secondary carrier to transmit a predetermined amount of the data and the primary carrier for to transmit any remaining amount of the data; and
means for operating in the second mode when the indicator instructs to operate in the second mode, wherein operation in the second mode comprises selection of the primary carrier for transmitting the data when the size of the data is less than a predetermined threshold, and selection of the secondary carrier for transmitting a predetermined amount of the data and the primary carrier for transmitting any remaining amount of the data when the size of the data is greater than or equal to the predetermined threshold.

16. The wireless user equipment of claim 15, wherein the means for operating in the second mode further comprise:
means for transmitting an indicator to inform a network of the uplink scheduling where the predetermined amount of the data will be transmitted on the secondary carrier and any remaining amount of the data on the primary carrier, wherein the indicator is transmitted before the data is transmitted; and
means for receiving an acknowledgement of the transmitted indicator from the network, wherein the acknowledgement is received before the data is transmitted.

17. The wireless user equipment of claim 15, further comprising:

means for transmitting the data on the primary carrier when the size of the data is greater than or equal to the predetermined threshold, and when the data is non-scheduled data.

18. The wireless user equipment of claim 15, further comprising:
means for receiving a message indicating a value for the predetermined threshold.

19. The wireless user equipment of claim 15, wherein the predetermined threshold is a buffer occupancy threshold associated with a size of the data in a buffer.

20. The wireless user equipment of claim 15, wherein receiving the indicator including an instruction to operate in the first mode comprises receiving the indicator including an instruction to set the predetermined threshold to a value of zero.

21. The wireless user equipment of claim 15, wherein receiving the indicator including an instruction to operate in the second mode comprises receiving the indicator including an instruction to set the predetermined threshold to a value greater than zero.

22. A non-transitory processor-readable storage medium storing processor-executable programming for causing a processing circuit to:
receive an indicator including an instruction to operate in one of a first mode or a second mode for transmitting data via the communications interface;
operate in the first mode when the indicator instructs to operate in the first mode, wherein operation in the first mode comprises selection of the secondary carrier to transmit an initial portion of the data via the communications interface and selection of the primary carrier to transmit any remaining portion of the data via the communications interface; and
operate in the second mode when the indicator instructs to operate in the second mode, wherein operation in the second mode comprises selection of the primary carrier to transmit the data when the size of the data is less than the predetermined threshold, and selection of the secondary carrier to transmit an initial portion of the data and the primary carrier to transmit any remaining portion of the data when the size of the data is greater than or equal to the predetermined threshold.

23. The processor-readable storage medium of claim 22, wherein the processor-executable programming for causing a processing circuit to operate in the second mode further comprises processor-executable programming for causing a processing circuit to:
transmit on a first transmission time interval on the primary carrier an indication that the wireless user equipment will transmit the initial portion of the data on the secondary carrier and any remaining portion of the data on the primary carrier, wherein the indication is transmitted before the data is transmitted; and
receive an acknowledgment of the transmitted indication.

24. The processor-readable storage medium of claim 22, further comprising processor-executable programming for causing a processing circuit to:
transmit non-scheduled data on the primary carrier when the size of the data is greater than or equal to the predetermined threshold.

25. The processor-readable storage medium of claim 22, further comprising processor-executable programming for causing a processing circuit to:
receive a message indicating a value for the predetermined threshold.

26. The processor-readable storage medium of claim 22, wherein the predetermined threshold is a buffer occupancy threshold associated with a size of the data in a buffer.

27. The processor-readable storage medium of claim 22, wherein the indicator including an instruction to operate in the first mode comprises an indicator including an instruction to set a buffer occupancy threshold to a value of zero.

28. The processor-readable storage medium of claim 22, wherein the indicator including an instruction to operate in the second mode comprises an indicator including an instruction to set a buffer occupancy threshold to a value greater than zero.

* * * * *